United States Patent
Korbecki et al.

(10) Patent No.: US 9,602,876 B2
(45) Date of Patent: Mar. 21, 2017

(54) SYSTEMS AND METHODS FOR PRESENTING MEDIA ASSET INFORMATION FOR A GIVEN CELL USING ADJACENT CELLS

(71) Applicant: United Video Properties, Inc., Santa Clara, CA (US)

(72) Inventors: William J. Korbecki, Crystal Lake, IL (US); Paul Jensen, Menlo Park, CA (US)

(73) Assignee: Rovi Guides, Inc., San Carlos, CA (US)

( * ) Notice: Subject to any disclaimer, the term of this patent is extended or adjusted under 35 U.S.C. 154(b) by 400 days.

(21) Appl. No.: 13/778,962

(22) Filed: Feb. 27, 2013

(65) Prior Publication Data

US 2014/0245144 A1    Aug. 28, 2014

(51) Int. Cl.

| | |
|---|---|
| *H04N 5/445* | (2011.01) |
| *G06F 3/048* | (2013.01) |
| *G06F 17/00* | (2006.01) |
| *G06F 3/00* | (2006.01) |
| *H04N 21/472* | (2011.01) |
| *H04N 21/41* | (2011.01) |
| *H04N 21/482* | (2011.01) |
| *H04N 21/8549* | (2011.01) |

(52) U.S. Cl.
CPC ... *H04N 21/47202* (2013.01); *H04N 21/4126* (2013.01); *H04N 21/4821* (2013.01); *H04N 21/8549* (2013.01)

(58) Field of Classification Search
CPC   G06F 3/048; G06F 3/00; G06F 17/00; H04N 5/445
USPC .......................................................... 715/716
See application file for complete search history.

(56) References Cited

U.S. PATENT DOCUMENTS

| | | | |
|---|---|---|---|
| 7,028,258 B1* | 4/2006 | Thacker et al. | 715/209 |
| 2003/0182661 A1* | 9/2003 | Ellis | A63F 13/12 725/60 |
| 2007/0097022 A1* | 5/2007 | Willebrand | 345/10 |
| 2007/0130502 A1* | 6/2007 | Tolgu | G06Q 10/109 715/205 |
| 2009/0031208 A1* | 1/2009 | Robinson | G06F 17/246 715/227 |
| 2009/0165046 A1* | 6/2009 | Stallings et al. | 725/39 |

(Continued)

*Primary Examiner* — Jennifer To
*Assistant Examiner* — Hugo Molina
(74) *Attorney, Agent, or Firm* — Ropes & Gray LLP

(57) ABSTRACT

Systems and methods for presenting information for a given cell using adjacent cells are provided. A plurality of media asset cells arranged in a grid are generated for presentation according to a time dimension of first and second transmission times of corresponding media assets. A user selection of a first media asset cell is received. The first media asset cell corresponds to a first media asset scheduled for transmission during the first transmission time. A second media asset cell that corresponds to a second media asset scheduled for transmission during the first transmission time is identified. The second media asset cell includes information corresponding to the second media asset and is adjacent to the first media asset cell. A portion of the information in the second media asset cell is replaced with information corresponding to the first media asset without obstructing information corresponding to the second transmission time.

14 Claims, 5 Drawing Sheets

(56) References Cited

U.S. PATENT DOCUMENTS

| | | | |
|---|---|---|---|
| 2009/0189903 A1* | 7/2009 | Imai | G06F 3/0485 |
| | | | 345/467 |
| 2010/0175023 A1* | 7/2010 | Gatlin | G06F 3/0481 |
| | | | 715/788 |
| 2011/0162010 A1* | 6/2011 | Ellis | G06F 17/30029 |
| | | | 725/40 |
| 2012/0036455 A1* | 2/2012 | Holt | G06F 3/0482 |
| | | | 715/753 |
| 2013/0212458 A1* | 8/2013 | Okada et al. | 715/217 |
| 2014/0164896 A1* | 6/2014 | Schlereth | G06F 17/246 |
| | | | 715/217 |

* cited by examiner

SYSTEMS AND METHODS FOR PRESENTING MEDIA ASSET INFORMATION FOR A GIVEN CELL USING ADJACENT CELLS

BACKGROUND

Traditional media systems allow users to view a detailed description for a given media asset either in a dedicated portion of a display or another screen. Typically, the user must select a media asset listing for which to view the detailed description. The media system will then either display the detailed description in a dedicated overlay (e.g., on the lower portion of the display) or navigate the user to a separate screen in which the information is presented. By overlaying the information, or changing screens, these media systems prevent other media asset information that was being shown, and which may be relevant to the user, from being seen. Accordingly, selecting content becomes more difficult and tedious because the user is required to perform multiple steps to see additional information about a media asset and see other media assets that are available for viewing.

SUMMARY

These and other objects are accomplished in accordance with the principles of the present invention by providing enhanced user equipment configured to provide more efficient navigation on interactive grid displays.

In some embodiments, a grid is generated for presentation. The grid may include a plurality of media asset cells arranged according to a time dimension that includes a first transmission time and a second transmission time of corresponding media assets. In some implementations, another dimension of the grid that is perpendicular to the time dimension may represent media asset characteristics of the media assets corresponding to the media asset cells. In some implementations, each of the plurality of media asset characteristics identifies a plurality of media assets. The media asset characteristics may include content source of a respective one of the media assets, type of content source of a respective one of the media assets, category or type of a respective one of the media assets, and/or and combination thereof.

A user selection of a first of the plurality of media asset cells may be received. The first media asset cell may correspond to a first media asset that is scheduled for transmission during the first transmission time. A second of the plurality of media asset cells that corresponds to a second media asset scheduled for transmission during the first transmission time may be identified in response to receiving the user selection. The second media asset cell includes information corresponding to the second media asset. The second media asset cell may be adjacent to the first media asset cell in the grid. In particular, the first media asset cell may be positioned along a first row of media asset cells in the grid and the second media asset cell may be positioned along a second row of media asset cells in the grid adjacent to and under the first row.

A portion of the information in the second media asset cell may be replaced with information corresponding to the first media asset without obstructing information corresponding to the second transmission time from being presented. In particular, the first media asset cell may be combined with the second media asset cell to generate an expanded region of the grid in which to present the information corresponding to the first media asset. The information corresponding to the first media asset may include a detailed description, a video window, a preview, an image, a related media asset list, a website URL, or any combination thereof that is different from the title of the first media asset. Specifically, the title of the first media asset may remain displayed in the first media asset cell and the media asset information corresponding to the first media asset may be displayed in the portion of the second media asset cell instead of displaying the title of the second media asset. In some implementations, the information corresponding to the second transmission time may include titles of media assets scheduled for transmission during the second transmission time.

In some embodiments, a first size of the information corresponding to the first media asset may be computed. A second size of each media asset cell in a subset of the plurality of media asset cells in the grid that corresponds to a media asset scheduled for transmission during the first transmission time may be computed. A determination may be made based on the second size of each of the media asset cells in the subset as to how many of the media asset cells in the subset are needed to be combined to fit the information corresponding to the first media asset having the first size. A number of the media asset cells in the subset may be selected based on the determination. The selected media asset cells may be combined with the first media asset cell to enlarge a size of the first media asset cell. Information in each of the selected media asset cells may be replaced with the information corresponding to the first media asset.

In some embodiments, media asset cells may be arranged in a grid where each column of the grid represents a different transmission time of corresponding media assets and each row of the grid represents a different content source of the media assets. The media asset cells may present titles of the corresponding media assets. In response to receiving a user selection of one of the media asset cells, a determination of the transmission time corresponding to the selected cell may be made to identify the corresponding column of the grid. At least some of the cells in the same column as the selected cell that are underneath the selected cell starting from the cell that is adjacent to the selected cell may be identified. The identified cells may be combined with the selected cell to generate an expanded version of the selected cell. Detailed information about a media asset corresponding to the selected cell may be displayed in the expanded version of the selected cell in place of the titles shown in the identified cells. Specifically, the detailed information may be presented in only the column corresponding to the selected cell (e.g., the column corresponding to the transmission time of the selected cell).

In some implementations, the selected cell may correspond to more than one column. Specifically, the selected cell may correspond to a media asset that is scheduled for transmission by a content source during a period spanning multiple transmission times. In such circumstances, at least some of the cells in the same multiple columns as the selected cell that are underneath the selected cell starting from the cell that is adjacent to the selected cell may be identified. These identified cells spanning the multiple columns may be combined with the selected cell to generate an expanded version of the selected cell. In such circumstances, the amount of information that can be presented in the expanded version of the selected cell that spans multiple columns or transmission times may be greater than the amount of information that can be presented in the expanded version of the selected cell of only one column.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION OF EMBODIMENTS

Figure 1:
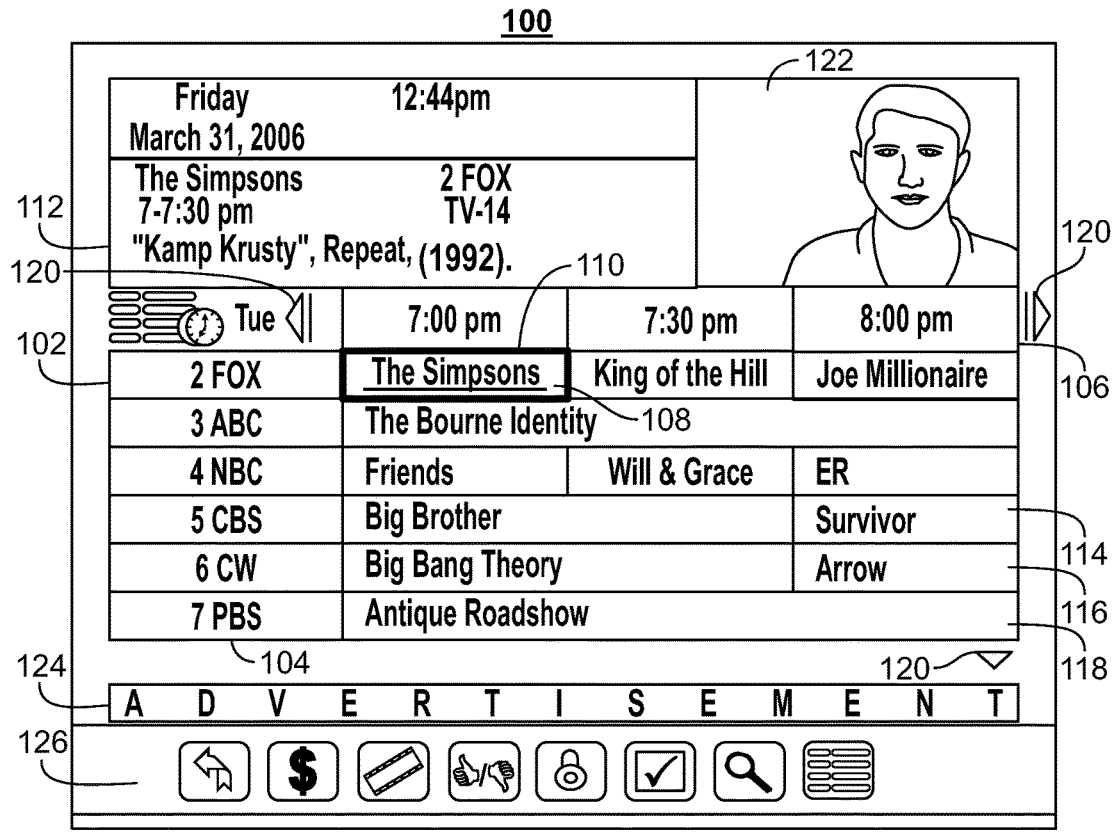
FIG. 1 is a diagram of an interactive grid display in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
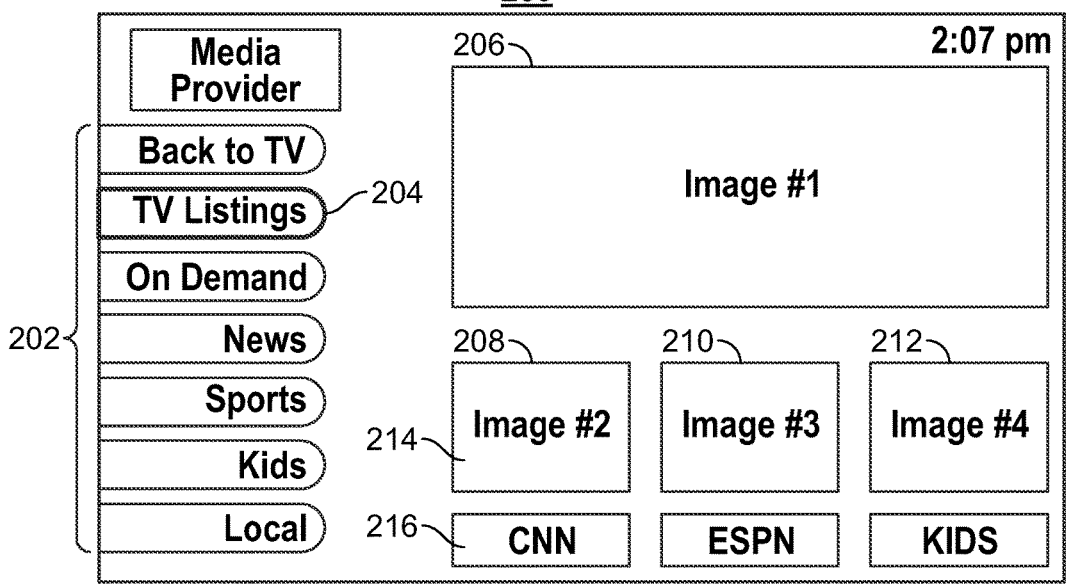
FIG. 2 is a diagram of an interactive media system in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available or media asset characteristics; and (2) a row of time identifiers 106, where each time identifier (which is a cell in the row) identifies a time block of programming. The media asset characteristics indicated in column of channel/content type identifiers 104 may include any combination of criteria that identifies a plurality of media assets (e.g., content source of a respective one of the media assets, a content type of the respective one of the media assets, or a content category of the respective one of the media assets). Although grid 102 is a by time-channel grid, any other type of grid may be provided such that time is shown on one dimension and a media characteristic is shown on another. For example, grid 102 may be arranged so that time is shown as in grid 102 and the column of identifiers may represent categories of different media assets or types of content sources (e.g., satellite and Internet). In particular, instead of showing the different programs available on a given channel (e.g., channel 2, FOX) at various times, grid 102 may display different programs that are of the genre or category (comedy) at various times regardless of what source they are received from.

Grid 102 also includes cells of program listings, such as program listing 108, where each listing provides the title of the program provided on the listing's associated channel and time. As referred to herein, the term "program" should be understood to be synonymous with "media". With a user input device, a user can select program listings by moving highlight region 110. Information relating to the program listing selected by highlight region 110 may be provided in program information region 112. Alternatively or in addition, as discussed below in connection with FIGS. 5 and 6, the information may be provided using other cells corresponding to the same transmission time as a program corresponding to the selected listing. Region 112 may include, for example, the program title, the program description, the time the program is provided (if applicable) (e.g., the transmission time of the program), the channel or content source of the program (if applicable), the program's rating, and other desired information.

In addition to providing access to linear programming (e.g., content that is scheduled to be transmitted to a plurality of user equipment devices at a predetermined transmission time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listings, recorded content listings, and Internet content listings. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.) Specifically, the user may navigate along the time dimension to later or earlier times using icons 120.

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to, or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as, allrovi.com from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200, the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
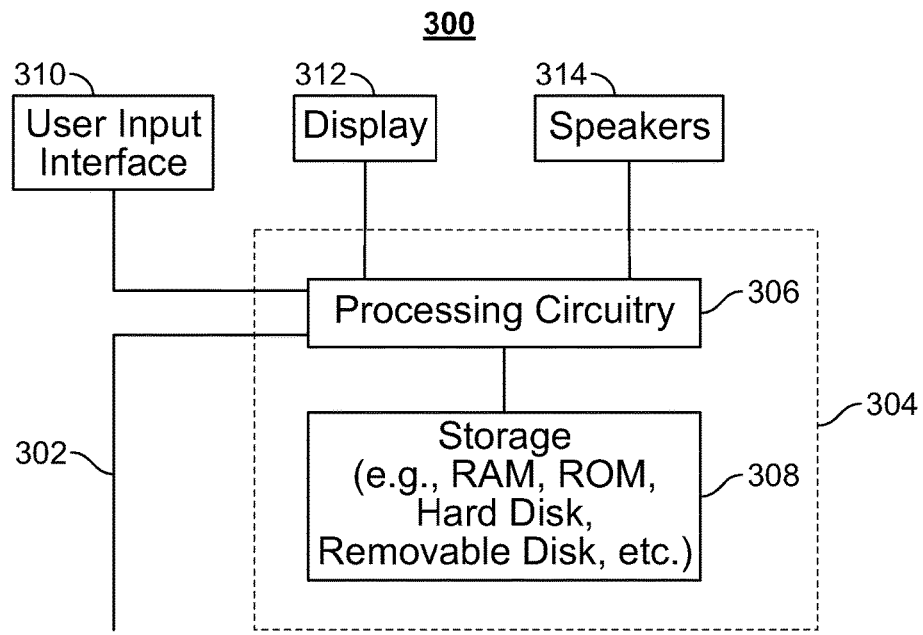
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
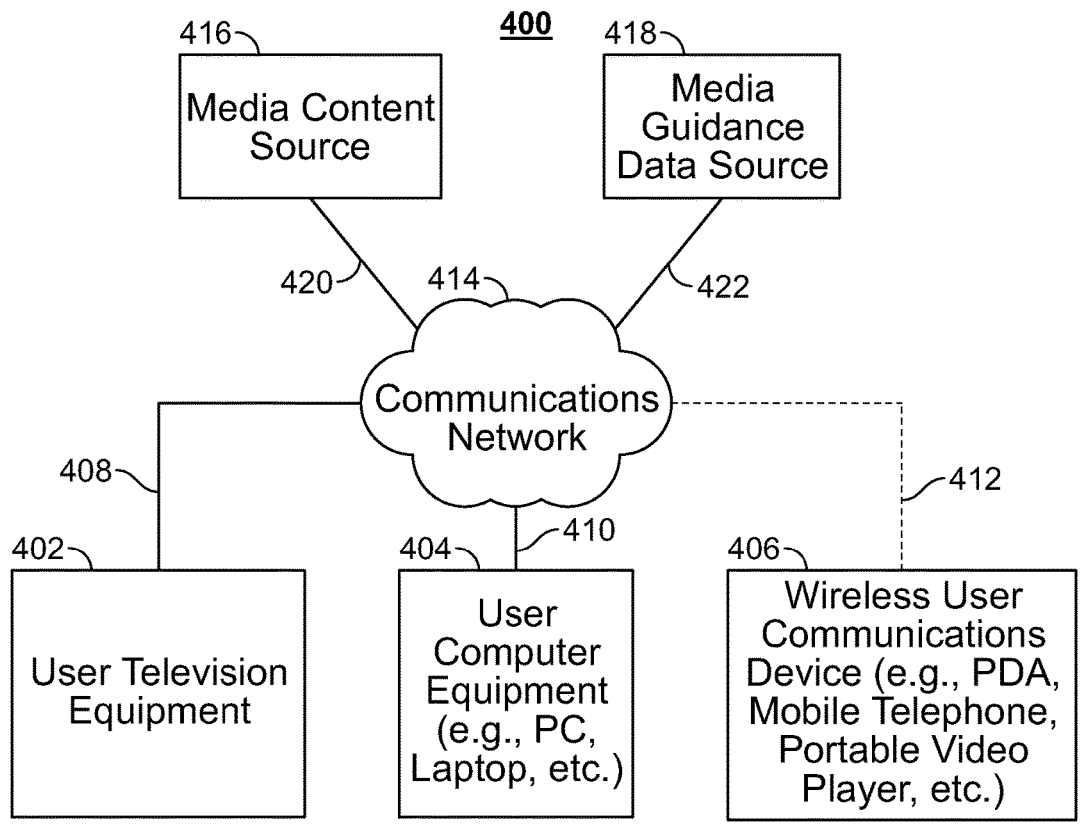
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device.

In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, which provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same type. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry 304 may present additional information about a selected media asset using other cells in grid 102. Control circuitry 304 may present this additional information instead of or in addition to presenting the additional information in a separate dedicated program information region. Specifically, control circuitry 304 may present the additional information using only cells in grid 102 that correspond to media assets scheduled for transmission at the same time as the selected media asset corresponding to the selected cell in grid 102. The cells in grid 102 used to present the additional information about the selected cell may be adjacent along the media characteristic dimension (e.g., the channel column) to the selected cell. In some implementations, the number of cells in grid 102 selected to present the additional information may be based on the size of the additional information. Specifically, if the additional information can fit into the space occupied by three cells, control circuitry 304 may only present the additional information using three cells in grid 102 without modifying any more cells that correspond to media assets scheduled for transmission at the same time as the selected cell.

Figure 5:
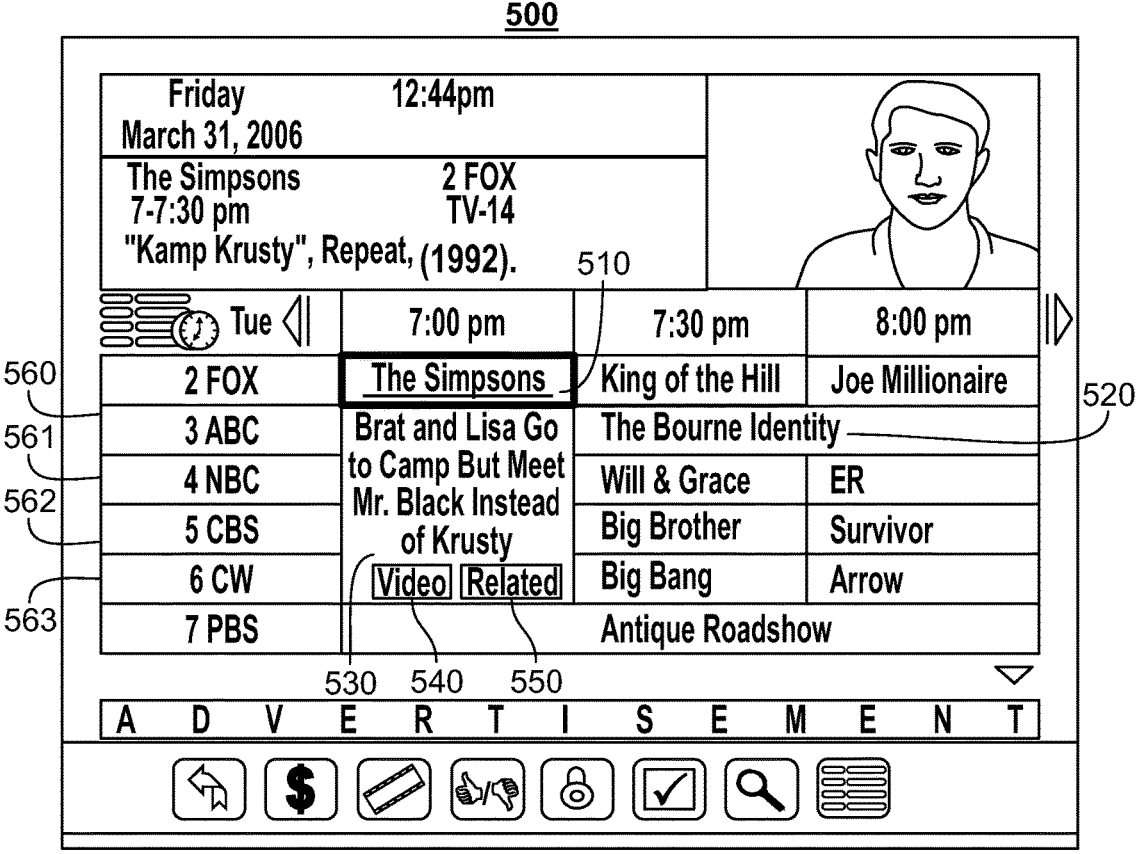
FIG. 5 is a diagram of an interactive grid display after a user selection of a media asset cell has been received in accordance with some embodiments of the disclosure.

FIG. 5 is a diagram 500 of an interactive grid display after a user selection of a media asset cell has been received in accordance with some embodiments of the disclosure. The grid shown in diagram 500 may be similar in functionality to grid 102 (FIG. 1). Specifically, grid 102 may include a time dimension along the horizontal axis and a media asset characteristic dimension along the vertical axis. The time dimension may represent transmission times of media assets corresponding to cells in grid 102. The media asset characteristic dimension may represent one or more media characteristics of media assets corresponding to cells in grid 102. For example, the media asset characteristic dimension may be channels or content sources from which the corresponding media assets are received. Grid 102 may be arranged such that each column represents a different transmission time of the corresponding media assets and each row represents a different media asset characteristic (e.g., a different content source) of the media assets.

Control circuitry 304 may generate the grid shown in diagram 500 after receiving a user selection of media asset cell 510 over which highlight region 110 is positioned. For example, control circuitry 304 may receive a user request for further information (e.g., a user may press an INFO key or ENTER key) when a highlight region is positioned over media asset cell 510. In response to receiving a user request for further information for media asset cell 510, control circuitry 304 may retrieve from storage 308 media asset information associated with a media asset corresponding to the selected media asset cell 510. For example, a user may select a media asset cell 510 corresponding to the media asset ("The Simpsons"). In response, control circuitry 304 may retrieve from storage 308 a detailed description for the episode corresponding to selected media asset cell 510.

Control circuitry 304 may compute a length of a size of the detailed description. For example, control circuitry 304 may determine how many characters (or the size of the graphics) in the retrieved detailed description. Control circuitry 304 may identify another cell that is adjacent to selected media asset cell 510. Specifically, control circuitry 304 may identify a transmission time (e.g., the period between 7 PM and 7:30 PM) of a media asset associated with selected media asset cell 510 and determine which other media asset cells in grid 102 that are in the current display have media assets that correspond to the same transmission time. For example, control circuitry 304 may identify all the media asset cells in the display that have media assets scheduled for transmission during the period between 7 PM and 7:30 PM. In particular, control circuitry 304 may identify all other media asset cells in the rows of grid 102 that are underneath the row of selected media asset cell 510 and are in the same column of grid 102 (e.g., the column representing the transmission time of the media asset corresponding to selected media asset cell 510) as selected media asset cell 510.

In some implementations, in response to receiving a user request for further information for media asset cell 510, control circuitry 304 may determine the transmission time associated with the media asset corresponding to selected media asset cell 510. Control circuitry 304 may query display circuitry to determine what subset media asset characteristics are currently being shown in the display. For example, control circuitry 304 may query display circuitry to determine what subset of content sources are currently being shown in the display. Control circuitry 304 may transmit a query to a local or remote database with the determined transmission time and the list of the subset of media asset characteristics. The query may request a list of corresponding cells or media assets that are scheduled for transmission during the determined transmission time. The local or remote database may return to control circuitry 304 the list of media assets or corresponding cells.

Based on the retrieved list of cells, control circuitry 304 may identify one of the cells that is closest or adjacent to selected cell 510. Specifically, control circuitry 304 may identify one of the cells that is in the next row under selected cell 510 and in the same column as selected cell 510. Control circuitry 304 may compute a size of a portion of the adjacent cell that corresponds to the determined transmission time (e.g., the transmission time of the media asset corresponding to selected cell 510). For example, a first media asset characteristic 560 (e.g., the content source ABC) may be adjacent to the media asset characteristic of selected media asset cell 510. Media asset characteristic may have a media asset "The Bourne Identity" that is scheduled for transmission during a continuous time interval of 7 PM to 8:30 PM. Accordingly, the cell in grid 102 corresponding to this media asset may be adjacent to selected media asset cell 510 and may have a size that spans the transmission times 7 PM-8 PM (e.g., two columns in grid 102). However, the transmission time of the media asset corresponding to selected media asset cell 510 may only span the interval of 7 PM to 7:30 PM (e.g., only span one column in grid 102). In such circumstances, control circuitry 304 may compute a size of only the portion of the adjacent cell that corresponds to the determined transmission time (e.g., only the portion in one column). Specifically, control circuitry 304 may compute a size of the cell corresponding to the media asset "The Bourne Identity" that corresponds to the transmission time that spans 7 PM to 7:30 PM and exclude from the size computation the remaining part of the cell (e.g., the portions of the cell that span the transmission time 7:30 PM to 8:30 PM—the second column of grid 102).

In some implementations, control circuitry 304 may combine the portion of the adjacent cell with selected media asset cell 510 to generate a combined media asset cell in grid 102. In particular, control circuitry 304 may combine the cell in the first row and first column of grid 102 corresponding to selected media asset cell 510 with the adjacent cell in the second row and first column of grid 102. Control circuitry 304 may measure or compute the size of the combined media asset cell. Control circuitry 304 may compare the size of the combined media asset cell with the size of the media asset information corresponding to the media asset of selected media asset cell 510. Specifically, control circuitry 304 may determine whether the size of the combined media asset cell exceeds the size of the media asset information or is large enough to fit the media asset information. In response to determining that the combined cell size is sufficient to fit the media asset information, control circuitry 304 may replace the information being presented in the portion of the adjacent cell corresponding to first media characteristic 560 with the media information for the media asset corresponding to selected cell 510.

In response to determining that the combined cell size is insufficient to fit the media asset information, control circuitry 304 may select another cell that is adjacent to the combined cell in the determined transmission time. In particular, control circuitry 304 may select the cell positioned in the third row and first column since the third row is adjacent to the combined cell which spans the first and second rows of grid 102. For example, the combined cell may consist of selected cell 510 and the portion of the cell associated with a media asset transmitted during the determined transmission time (e.g., the period between 7 PM and 7:30 PM) corresponding to first media asset characteristic 560. The cell that is adjacent to the combined cell in the determined transmission time may be the cell associated with a media asset transmitted during the determined transmission time (e.g., the period between 7 PM and 7:30 PM) corresponding to a second media asset characteristic 561 (e.g., the content source NBC). Control circuitry 304 may repeat (1) the determination of whether combining the adjacent cell with the combined cell will create a cell having sufficient capacity or size to fit the media asset information of the media asset corresponding to selected cell 510 and (2) the combining of the adjacent cell with the combined cell to create a larger cell until the combined cell is determined to be large enough to fit all of the media asset information corresponding to selected cell 510.

For example, control circuitry 304 may determine that four media asset cells are needed to be combined with selected media asset cell 510 in order to fit the media asset information 530 of the media asset corresponding to selected cell 510. The four cells may be adjacent to each other and may each correspond to the same transmission time as the transmission time of the media asset corresponding to selected cell 510. For example, the four cells may include the cell portion corresponding to the transmission time between 7 PM and 7:30 PM for first media asset characteristic 560, the cell corresponding to the transmission time between 7 PM and 7:30 PM for second media asset characteristic 561, the cell corresponding to the transmission time between 7 PM and 7:30 PM for a third media asset characteristic 562, and the cell portion corresponding to the transmission time between 7 PM and 7:30 PM for a third media asset characteristic 563.

In some embodiments, media asset information 530 may include any combination of text, website addresses, video, or images that are associated with the media asset corresponding to selected cell 510. For example, media asset information may include a preview video 540 showing a clip of the media asset corresponding to selected cell 510. Media asset information may include a video showing the current video being provided by a content source of the media asset corresponding to selected cell 510 (e.g., the current video on a channel providing the media asset). Media asset information may include a related information option 550. A user may navigate highlight region 110 over related information option 550 to select the option. In response to receiving a user selection of option 550, control circuitry 304 may navigate the user to a display of related information. The display of related information may be provided as an overlay in a window next to cell 510 or in a separate display screen. Related information may include media assets that are related by subject matter to the media asset corresponding to selected cell 510. Media asset information may include other media asset options, such as a set reminder option (which when selected sets a future reminder to watch the media asset) or a record option (which when selected schedules a future recording of the media asset). Any other option related to the media asset corresponding to selected cell 510 may be included in the combined media asset cell.

In some embodiments, control circuitry 304 may skip or avoid the determination of how many adjacent cells are needed to be combined to fit media asset information 530. Specifically, control circuitry 304 may retrieve a data structure associated with selected media asset cell 510. The retrieved data structure may indicate the size of media asset information 530 and the number of adjacent cells needed to present media asset information 530 in grid 102. Control circuitry 304 may select a number of cells directly under or adjacent to selected cell 510 corresponding to the number indicated by the data structure. Control circuitry 304 may replace the information presented in the selected adjacent cells with media asset information 530. If possible, control circuitry 304 may shift information from being presented in one portion of one of the selected cells to another portion of the selected cell that corresponds to a later or earlier transmission time. Control circuitry 304 may maintain information being shown elsewhere in the display from being obscured when the information in the combined cells is replaced. Specifically, control circuitry 304 may prevent information shown in cells or cell portions corresponding to later or earlier transmission times than the transmission time of selected cell 510 from being obscured in the display.

In some embodiments, control circuitry 304 may maximize the amount of vertical space available to present media asset information 530. Specifically, in response to receiving a user request to present media asset information for selected cell 510, control circuitry 304 may determine whether the media characteristic corresponding to selected cell 510 is in the first row of media asset characteristics (e.g., whether the corresponding media asset characteristic is at the top of grid 102). In particular, control circuitry 304 may determine whether selected cell 510 is positioned at the top of grid 102. In response to determining that selected cell 510 is not at the top or is not in the first row of grid 102, control circuitry 304 may automatically shift grid 102 down/up in order to cause the media characteristic corresponding to selected cell 510 to be presented in the first row of grid 102. In particular, control circuitry 304 may automatically shift grid 102 down/up in order to cause selected cell 510 to be presented in the first row of grid 102.

In some implementations, control circuitry 304 may determine whether the adjacent cell from which a first portion has been replaced with media asset information for the media asset corresponding to selected cell 510 includes a second portion that corresponds to a different transmission time (e.g., a portion in the second column of grid 102). For example, the cell corresponding to the media asset "The Bourne Identity" may have a first portion corresponding to the transmission time that spans 7 PM to 7:30 PM (e.g., the first column) and a second portion corresponding to the transmission time that spans 7:30 PM to 8:30 PM (e.g., the second column). The first portion may be replaced with the media asset information for the media asset of selected cell 510 and the second portion may be unaffected or unmodified. Control circuitry 304 may determine whether a size of the second portion is sufficient to present the information that has been replaced from the first portion. In response to determining that the size of the second portion is sufficient, control circuitry 304 may present the information from the first portion in the second portion. For example, the title "The Bourne Identity" 520 may have been partially display in the first portion and accordingly control circuitry 304 may move the portion of the title displayed in the first portion of the adjacent cell to the second portion of the cell.

In some embodiments, selected media asset cell 510 may span two or more transmission times. Specifically, selected media asset cell 510 may span multiple columns in grid 102. For example, selected media asset cell 510 may correspond to a media asset that is scheduled for transmission during the period from 7 PM to 8 PM (e.g., a period spanning two transmission times or columns in grid 102). In such circumstances, each media asset cell in grid 102 identified by control circuitry 304 to be combined with selected media asset cell 510 may correspond to the first transmission time (e.g., the first column) and the second transmission time (e.g., the second column). Accordingly, some rows in grid 102 may have multiple cells replaced if each cell corresponds to one transmission time while other rows in grid 102 may have one larger cell replaced that corresponds to two transmission times with information corresponding to the media asset corresponding to selected cell 510.

In particular, selected media asset cell 510 may be in the first row of grid 102 and may correspond to a first media asset that is scheduled for transmission during the period from 7 PM to 8 PM (e.g., a period spanning the first transmission time and the second transmission time or first and second columns in grid 102). In response to receiving a request for media asset information corresponding to selected media asset cell 510, control circuitry 304 may process the second row of grid 102 to determine whether one or two media asset cells are in the first and second columns of the second row. If two media asset cells are in the first and second columns (e.g., the second row of grid 102 includes a second media asset scheduled for transmission during the first transmission time and a third media asset scheduled for transmission during the second transmission time), control circuitry 304 may combine the second and third media asset cells in the second row. Control circuitry 304 may then combine the two combined media asset cells from the second row with the first media asset cell in the first row that spans the first and second columns.

Control circuitry 304 may determine whether the media asset information for the first media asset fits in the combined media asset cell. When the media asset information fits, control circuitry 304 may replace the information in the portion of the combined media asset cell corresponding to the second row with the media asset information for the first media asset. Specifically, control circuitry 304 may replace the title of the second media asset in the second row corresponding to the first transmission time (e.g., the first column) and the title of the third media asset in the second row corresponding to the second transmission time (e.g., the second column) with the media asset information for the first media asset of selected media asset cell 510.

When the media asset information does not fit into the combined cell, control circuitry 304 may process the third row of grid 102 to determine whether one or two media asset cells are in the first and second columns for the third row. If one media asset cell is in the first and second columns (e.g., the third row of grid 102 includes a fourth media asset scheduled for transmission during the first transmission time and the second transmission time), control circuitry 304 may combine the media asset cell from the third row with the combined media asset cell that spans the first and second rows and that spans the first and second columns. Control circuitry 304 may determine whether the media asset information for the first media asset fits in the combined media asset cell that spans the first, second and third rows of grid 102 and the first and second columns. When the media asset information fits, control circuitry 304 may replace the information in a portion of the combined media asset cell corresponding to the second and third rows with the media asset information for the first media asset. Specifically, control circuitry 304 may replace the title of the second media asset in the second row corresponding to the first transmission time (e.g., the first column), the title of the third media asset in the second row corresponding to the second transmission time (e.g., the second column) and the title of the fourth media asset in the third row corresponding to the first and second transmission times (e.g., the first and second columns) with the media asset information for the first media asset of selected media asset cell 510.

Figure 6:
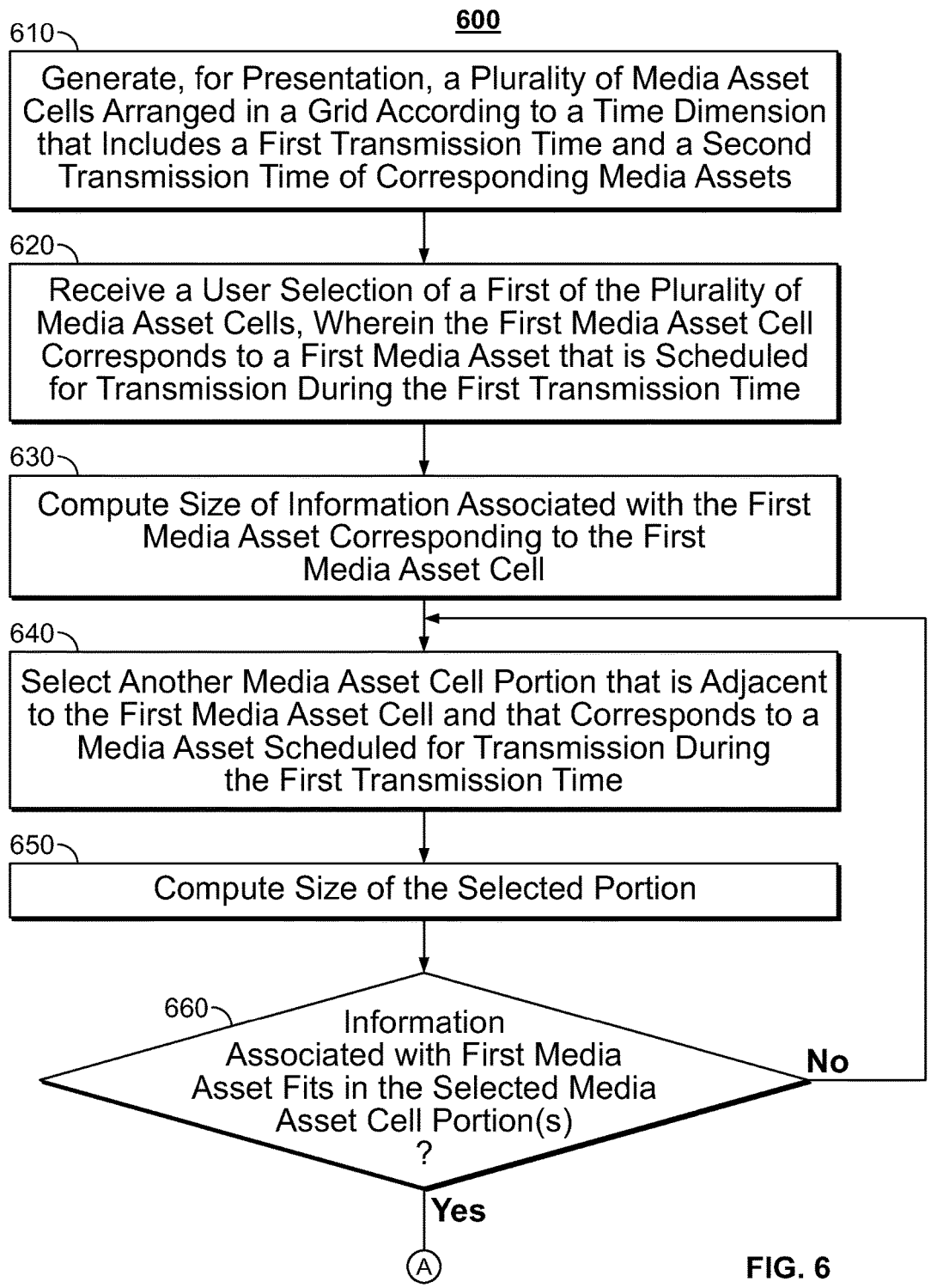
FIG. 6 is a flow diagram describing the process to present information for a media asset using other media asset cells in accordance with some embodiments of the disclosure.
Figure 6:
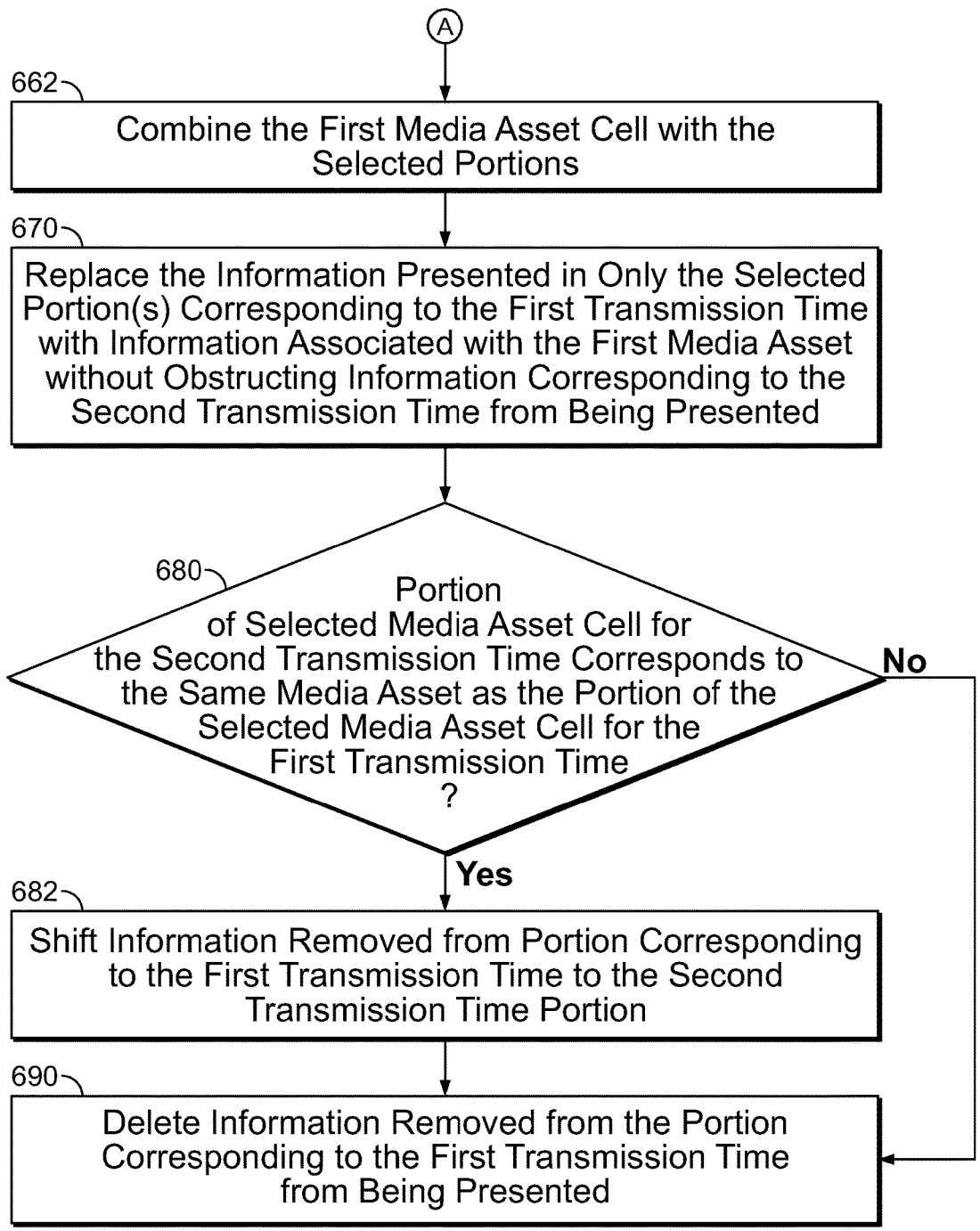

FIG. 6 is a flow diagram describing the process 600 to present information for a media asset using other media asset cells in accordance with some embodiments of the disclosure. At step 610, a plurality of media asset cells arranged in a grid are generated for presentation according to a time dimension that includes a first transmission time and a second transmission time of corresponding media assets. For example, control circuitry 304 may generate grid 102 which includes a first transmission time (e.g., the period spanning 7 PM to 7:30 PM) and a second transmission time (e.g., the period spanning 7:30 PM to 8 PM) along the time dimension (e.g., the time indicated on the horizontal axis) (FIGS. 1 and 5).

At step 620, a user selection of a first of the plurality of media asset cells is received, wherein the first media asset cell corresponds to a first media asset that is scheduled for transmission during the first transmission time. For example, control circuitry 304 may receive a user selection of media asset cell 510 that corresponds to the media asset (e.g., "The Simpsons") scheduled for transmission during the period spanning 7 PM to 7:30 PM (FIG. 5).

At step 630, size of information associated with the first media asset corresponding to the first media asset cell is computed. For example, control circuitry 304 may retrieve the media asset information associated with the media asset "The Simpsons" from storage 308. Control circuitry 304 may compute a length of the media asset information based on the number of characters in the media asset information. In some implementations, control circuitry 304 may retrieve a data structure associated with the media asset information which may indicate a length or size of the media asset information.

At step 640, another media asset cell portion that is adjacent to the first media asset cell and that corresponds to a media asset scheduled for transmission during the first transmission time is selected. For example, control circuitry 304 may select the media asset cell corresponding to a media asset scheduled for transmission in the period between 7 PM and 7:30 PM and that is associated with first media asset characteristic 560 (e.g., the content source "ABC"). Media asset cell corresponding to first media asset characteristic 560 is selected because it is adjacent to the media asset characteristic (e.g., the content source "FOX") corresponding to selected media asset cell 510.

At step 650, size of the selected portion is computed. For example, control circuitry 304 may compute how much information can fit in the selected media asset cell.

At step 660, a determination is made as to whether information associated with the first media asset fits in the selected media asset cell portion(s). In response to determining that the information fits, the process proceeds to step 662, otherwise the process proceeds to step 640. For example, control circuitry 304 may compare a size of the media asset information corresponding to selected media asset cell 510 with the size of the selected portion of the adjacent media asset cell.

At step 662, the first media asset cell is combined with the selected portion(s). For example, control circuitry 304 may create a larger media asset cell that corresponds only to the first transmission time by combining the selected media asset cell portions corresponding to the first transmission time with selected media asset cell 510.

At step 670, the information presented in only the selected portion(s) corresponding to the first transmission time is replaced with information associated with the first media asset without obstructing information corresponding to the second transmission time from being presented. For example, control circuitry 304 may replace the titles shown in the selected portions of the adjacent media asset cells corresponding to the first transmission time (e.g., the period between 7 PM and 7:30 PM) with media asset information 530.

At step 680, a determination is made as to whether a portion of the selected media asset cell for the second transmission time corresponds to the same media asset as the portion of the selected media asset cell for the first transmission time. In response to determining that the portion corresponds to the same media asset, the process proceeds to step 682, otherwise the process proceeds to step 690. For example, control circuitry 304 may determine whether a media asset cell in grid 102 that is adjacent to selected media asset cell 510 corresponds to a media asset that is scheduled for transmission during the first and second transmission times (e.g., the period spanning 7 PM and 8 PM). In particular, control circuitry 304 may determine whether a media asset cell in grid 102 that is adjacent to selected media asset cell 510 indicates that the corresponding media asset has duration longer than the first transmission time (e.g., a duration that spans multiple transmission times indicated in the time dimension).

At step 682, information removed from the portion corresponding to the first transmission time is shifted to the second transmission time portion of the media asset cell. For example, control circuitry 304 may move the portion of the title 520 from the portion of the media asset cell corresponding to the first transmission time to the portion of the cell corresponding to the second transmission time.

At step 690, information removed from the portion of the media asset cell corresponding to the first transmission time is deleted from being presented. For example, the title of the media asset shown in the media asset cell corresponding to second media asset characteristic 561 (e.g., the content source NBC) and the first transmission time is removed and replaced with a portion of the information corresponding to selected media asset 510.

It should be understood that the above steps of the flow diagrams of FIG. 6 may be executed or performed in any order or sequence not limited to the order and sequence shown and described in the figure. Also, some of the above steps of the flow diagram of FIG. 6 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for presenting information about a media asset, the method comprising:

generating, for presentation, a plurality of media asset cells arranged in a grid at respective display positions according to a time dimension that includes a first transmission time and a second transmission time of corresponding media assets;

receiving a user selection of a first of the plurality of media asset cells, wherein the selected first of the plurality of media asset cells corresponds to a first media asset that is scheduled for transmission during the first transmission time;

in response to receiving the user selection, computing a first size of information corresponding to the first media asset of the selected first of the plurality of media asset cells;

identifying a subset of the plurality of media asset cells in the grid that corresponds to a media asset scheduled for transmission during the first transmission time, wherein at least one media asset cell in the subset is adjacent to the selected first of the plurality of media asset cells;

computing a second size of each media asset cell in the identified subset of the plurality of media asset cells in the grid that corresponds to a media asset scheduled for transmission during the first transmission time;

computing, based on the computed first size of the selected first of the plurality of media asset cells and the computed second size of each of the media asset cells in the subset, a minimum number of media asset cells in the identified subset of the plurality of media asset cells in the grid that corresponds to a media asset scheduled for transmission during the first transmission time, wherein a sum of the computed second size of each of the minimum number of media asset cells in the identified subset of the plurality of media asset cells in the grid that corresponds to a media asset scheduled for transmission during the first transmission time is equal to or greater than the computed first size of the selected first of the plurality of media asset cells;

selecting the computed minimum number of the media asset cells in the identified subset of the plurality of media asset cells in the grid that corresponds to a media asset scheduled for transmission during the first transmission time, wherein at least one of the selected minimum number of the media asset cells is adjacent to the first of the plurality of media asset cells;

combining the selected minimum number of the media asset cells adjacent to the first of the plurality of media asset cells with the first of the plurality of media asset cells to enlarge a display size of the first of the plurality of media asset cells; and replacing information in each of the selected minimum number of the media asset cells adjacent to the first of the plurality of media asset cells with the information corresponding to the first media asset without obstructing information corresponding to any of the plurality of media asset cells arranged according to the second transmission time from being presented and without changing the respective display positions of the plurality of media asset cells arranged according to the second transmission time.

2. The method of claim 1, wherein the grid includes a dimension corresponding to a plurality of media asset characteristics, wherein each of the plurality of media asset characteristics identifies a plurality of media assets, wherein the first media asset corresponds to a first of the plurality of media asset characteristics, and wherein a second media asset corresponds to a second of the plurality media asset characteristics.

3. The method of claim 2, wherein a second media asset cell is adjacent to the first media asset cell along the dimension corresponding to the plurality of media asset characteristics.

4. The method of claim 2, wherein each of the plurality of characteristics is a content source of a respective one of the media assets, a content type of the respective one of the media assets, or a content category of the respective one of the media assets.

5. The method of claim 1, wherein the information corresponding to the second transmission time is presented in another portion of the selected media asset cells.

6. The method of claim 1, wherein the information corresponding to the first media asset includes a detailed description of the first media asset, and wherein the information corresponding to each of the selected media asset cells includes a title of the media asset corresponding to the respective selected media asset cell.

7. The method of claim 1, wherein the information corresponding to the second transmission time includes titles of media assets scheduled for transmission during the second transmission time.

8. A system for presenting information about a media asset, the system comprising:
a storage device configured to store information corresponding to a plurality of media assets; and
control circuitry configured to:
generate, for presentation, a plurality of media asset cells arranged in a grid at respective display positions according to a time dimension that includes a first transmission time and a second transmission time of corresponding media assets;
receive a user selection of a first of the plurality of media asset cells, wherein the selected first of the plurality of media asset cells corresponds to a first media asset that is scheduled for transmission during the first transmission time;
in response to receiving the user selection, compute a first size of information corresponding to the first media asset of the selected first of the plurality of media asset cells;
store, in the storage device, the computed first size of information corresponding to the first media asset of the selected first of the plurality of media asset cells;
identify a subset of the plurality of media asset cells in the grid that corresponds to a media asset scheduled for transmission during the first transmission time, wherein at least one media asset cell in the subset is adjacent to the selected first of the plurality of media asset cells;
compute a second size of each media asset cell in the identified subset of the plurality of media asset cells in the grid that corresponds to a media asset scheduled for transmission during the first transmission time;
store, in the storage device, the computed second size of each media asset cell in the identified subset of the plurality of media asset cells in the grid that corresponds to a media asset scheduled for transmission during the first transmission time;
retrieve, from the storage device, the computed first size of information corresponding to the first media asset of the selected first of the plurality of media asset cells and the computed second size of each media asset cell in the identified subset of the plurality of media asset cells in the grid that corresponds to a media asset scheduled for transmission during the first transmission time;
compute, based on the retrieved first size of the selected first of the plurality of media asset cells and the retrieved second size of each of the media asset cells in the subset, a minimum number of media asset cells in the identified subset of the plurality of media asset cells in the grid that corresponds to a media asset scheduled for transmission during the first transmission time, wherein a sum of the computed second size of each of the minimum number of media asset cells in the identified subset of the plurality of media asset cells in the grid that corresponds to a media asset scheduled for transmission during the first transmission time is equal to or greater than the computed first size of the selected first of the plurality of media asset cells;
select the computed minimum number of the media asset cells in the identified subset of the plurality of media asset cells in the grid that corresponds to a media asset scheduled for transmission during the first transmission time, wherein at least one of the selected minimum number of the media asset cells is adjacent to the first of the plurality of media asset cells;
combine the selected minimum number of the media asset cells adjacent to the first of the plurality of media asset cells with the first of the plurality of media asset cells to enlarge a display size of the first of the plurality of media asset cells; and
replace information in each of the selected minimum number of the media asset cells adjacent to the first of the plurality of media asset cells with the information corresponding to the first media asset without obstructing information corresponding to any of the plurality of media asset cells arranged according to the second transmission time from being presented and without changing the respective display positions of the plurality of media asset cells arranged according to the second transmission time.

9. The system of claim 8, wherein the grid includes a dimension corresponding to a plurality of media asset characteristics, wherein each of the plurality of media asset characteristics identifies a plurality of media assets, wherein the first media asset corresponds to a first of the plurality of media asset characteristics, and wherein a second media asset corresponds to a second of the plurality media asset characteristics.

10. The system of claim 9, wherein a second media asset cell is adjacent to the first media asset cell along the dimension corresponding to the plurality of media asset characteristics.

11. The system of claim 9, wherein each of the plurality of characteristics is a content source of a respective one of the media assets, a content type of the respective one of the media assets, or a content category of the respective one of the media assets.

12. The system of claim 8, wherein the information corresponding to the second transmission time is presented in another portion of the selected media asset cells.

13. The system of claim 8, wherein the information corresponding to the first media asset includes a detailed description of the first media asset, and wherein the information corresponding to each of the selected media asset cells includes a title of the media asset corresponding to the respective selected media asset cell.

14. The system of claim 8, wherein the information corresponding to the second transmission time includes titles of media assets scheduled for transmission during the second transmission time.

* * * * *